Figure 1:
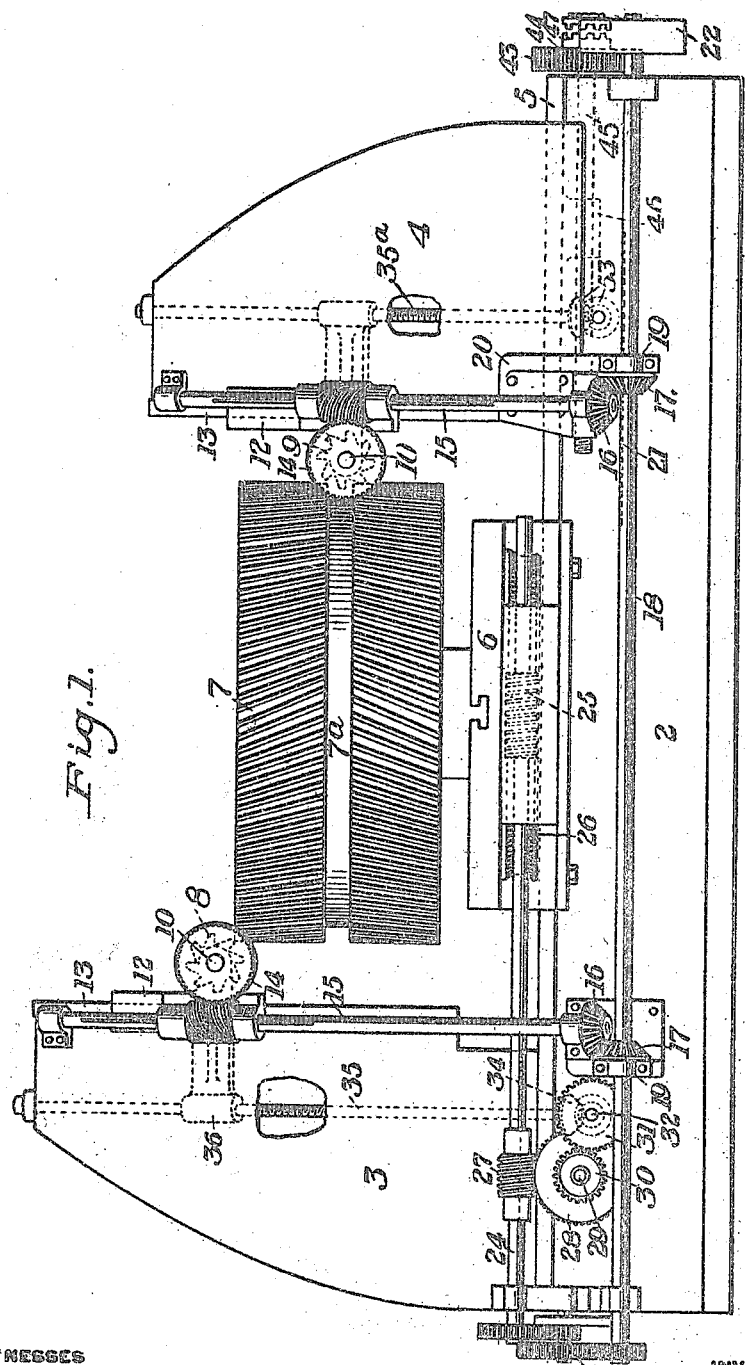

T. FAWCUS.
GEAR CUTTING MACHINE.
APPLICATION FILED FEB. 5, 1914.

1,208,532.

Patented Dec. 12, 1916.
3 SHEETS—SHEET 1.

WITNESSES
R A Balderson
G. B. Bluming

INVENTOR
Thomas Fawcus,
by Bakewell, Byrnes & Parmelee
Attys.

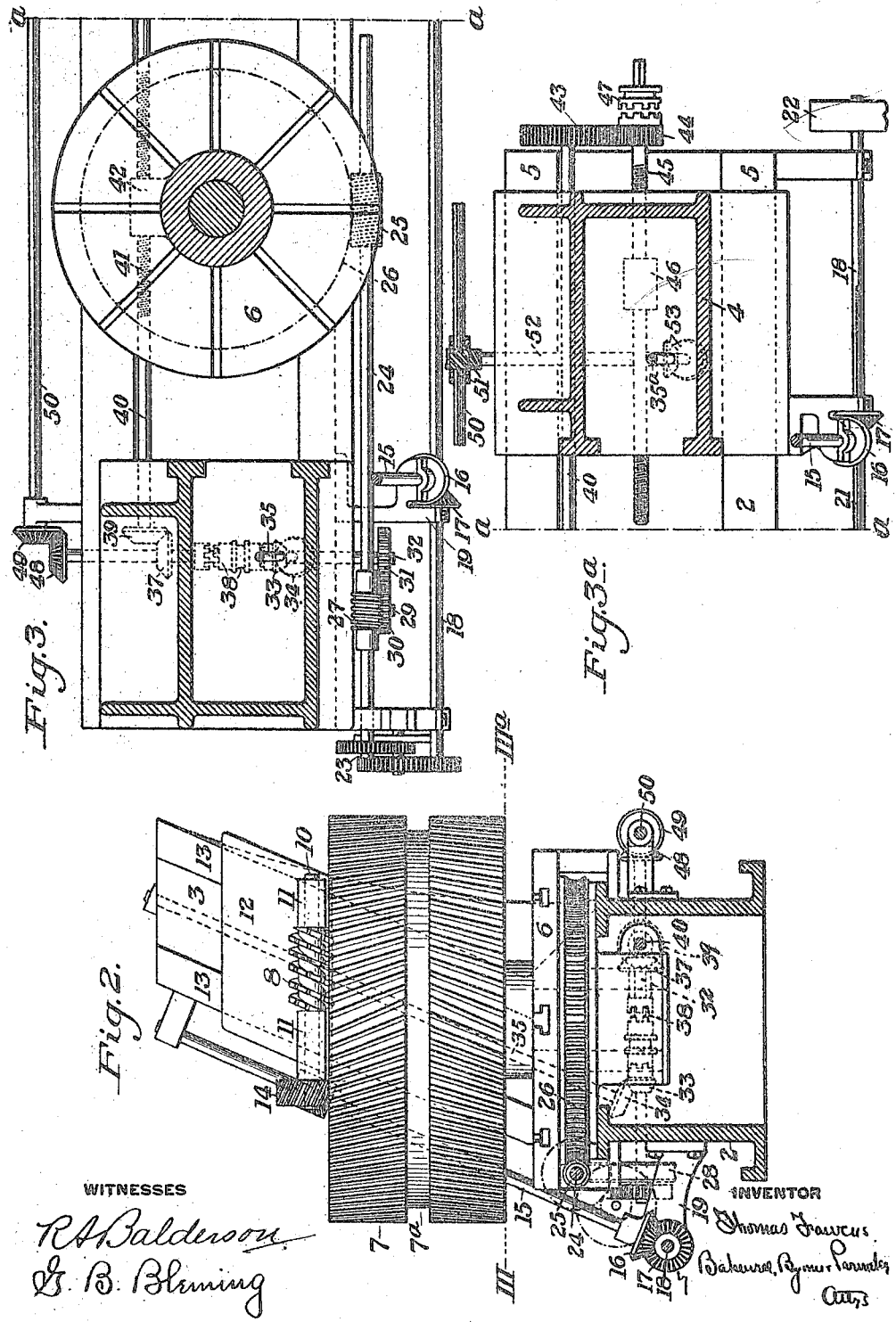

T. FAWCUS.
GEAR CUTTING MACHINE.
APPLICATION FILED FEB. 5, 1914.
1,208,532.
Patented Dec. 12, 1916.
3 SHEETS—SHEET 3.
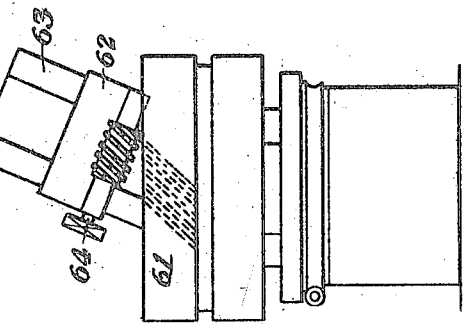
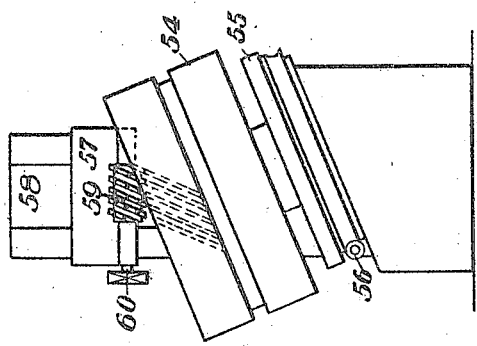
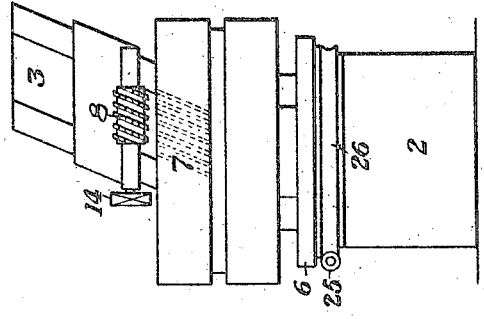

UNITED STATES PATENT OFFICE.

THOMAS FAWCUS, OF PITTSBURGH, PENNSYLVANIA.

GEAR-CUTTING MACHINE.

1,208,532.  Specification of Letters Patent.  Patented Dec. 12, 1916.

Application filed February 5, 1914. Serial No. 816,710.

*To all whom it may concern:*

Be it known that I, THOMAS FAWCUS, a citizen of the United States, residing at Pittsburgh, in the county of Allegheny and State of Pennsylvania, have invented a new and useful Improvement in Gear-Cutting Machines, of which the following is a full, clear, and exact description, reference being had to the accompanying drawings, in which—

Figure 1 is a side view of a portion of a gear cutting machine embodying my invention; Fig. 2 is a view partly in front elevation and partly in vertical section of a portion of the machine shown in Fig. 1; Figs. 3 and 3ª are horizontal sections, taken on the line III—IIIª of Fig. 2, Fig. 3ª being a continuation of the right hand end of Fig. 3; Fig. 4 is a diagrammatic elevation showing the relation of the blank, the guides and the cutter in the form of machine shown in the preceding figures; and Figs. 5 and 6 are similar to Fig. 4, but showing two different modifications.

My invention has relation to gear cutting machines for cutting double helical, or herringbone, gears, and of the general character described and claimed in my Patent No. 1,022,667, of April 9, 1912. The machine of that patent comprises a pair of rotary hobs mounted on separate axes and arranged to act upon a continuously revolving gear blank, with means for feeding both hobs in the same direction, in a line substantially parallel to the axis of the blank. In the machine of the said patent, in order to produce the required angularity of the teeth cut, differential gear mechanism was provided, whereby one of the hobs was driven at a speed relatively greater than the peripheral speed of the blank, and the other hob was driven at a speed slower than the peripheral speed of the blank. In my Patents No. 1,049,350, dated January 7, 1913, No. 1,067,013 and No. 1,067,014, dated July 8, 1913, I provided means for obviating this differential gear mechanism. In Patent No. 1,049,350, this was effected by a peculiar arrangement of the hob or cutter driving gears by which the speed of the two hobs or cutters was changed relatively to each other and to the blank by relative movements of certain of the gear elements. In Patent No. 1,067,013 the same result was effected by a different arrangement of the gearing in which one member of the gearing was movable axially of the other; and in my Patent No. 1,067,014 I effected this by giving the hobs an endwise movement in addition to their feeding movement.

My present invention provides a gear cutting machine of the same general character in which the angularity of the teeth is produced without necessitating any change in the speed of the hobs or cutters relatively to the peripheral speed of the blank and without the necessity for a separate endwise movement of the hobs or cutters in addition to their feeding movement.

To this end my invention consists in providing means whereby the hobs or cutters are fed in a direction at an angle to the axis of the blank.

The present invention is susceptible of a number of different embodiments. For instance, the desired result can be obtained by arranging the feed members which carry the hobs or cutters to move on guides which have the proper degree of angularity with respect to the axis of the blank; or the cutters may be fed in direct vertical lines and the blank may be supported with its axis at an angle to the direction of feed; or the angularity may be produced by moving the feed slides at an angle and also setting the axes of the hobs or cutters at an angle to the axis of the blank.

In Figs. 1 to 4 inclusive I have illustrated a machine which embodies the first of the above mentioned expedients, viz., the provision of means for feeding the hobs or cutters obliquely. In these figures the numeral 2 designates the frame of the machine having at one end a fixed head 3 and at the other end portion another head 4 which is movable toward and away from the head 3 on suitable guides 5. Intermediate these two heads is the rotary work support 6 upon which the gear blank 7 to be cut or finished is secured and rotated. 8 and 9 designate two rotary hobs or cutters, each of which is fixed to a transverse shaft 10 journaled in suitable bearings 11 on a feed slide 12. One of these feed slides is mounted upon each of the heads 3 and 4 for up and down movement, the two hobs or cutters acting at diametrically opposite portions of the blank. The two hobs or cutters are rotated in opposite directions, the cutter 8 making its cut from the top of the blank downwardly to the central clearance space 7ª thereof; and the cutter 9 making its cut downwardly from the lower edge of the clearance space to the bottom of the blank.

The guides 13 upon which the feed slides 12 are mounted are at an angle to the vertical, the degree of angularity corresponding to the desired angularity of the teeth to be cut or finished, as shown in Figs. 2 and 4. Each hob or cutter is driven by suitable gear connections, such as the spiral gears 14 between the shafts 10 and the oblique shafts 15. The shafts 15 may be driven in any suitable manner. I have shown each of them as provided with a bevel gear wheel 16 at its lower end meshing with the bevel gear wheel 17 on a main shaft 18 extending longitudinally of the machine and journaled in suitable bearings 19 at one side thereof. The bevel gear wheel 17 which drives the shaft 15 on the movable head 4 is connected with said head by the bracket 20 and has a sliding connection, indicated at 21, with the shaft 18, so as to be capable of movement longitudinally thereon as the head 4 is moved toward and away from the head 3. The shaft 18 may be driven from any suitable source of power. I have indicated a driving pulley 22 on the right hand end thereof. The opposite end portion of the shaft 18 is connected through a set of change gears 23 with a longitudinal shaft 24 above the shaft 18 and parallel therewith. The shaft 24 carries a worm 25 which drives a worm wheel 26 attached to the work support 6, and provides means for rotating the blank. The shaft 24 also carries a worm 27 meshing with a worm wheel 28 on a short transverse shaft 29 carrying a spur wheel 30 which meshes with the spur wheel 31 on another and longer transverse shaft 32. This shaft 32 carries a bevel gear wheel 33 which drives a bevel gear wheel 34 on the lower end of an oblique threaded or screw shaft 35. The shaft 35 passes through a nut portion 36 of the feed slide 12 at the left hand end of the machine. The transverse shaft 32 has loosely mounted thereon another bevel gear wheel 37 adapted to be connected to and disconnected from said shaft through the medium of a suitable clutch 38. The bevel gear wheel 37 meshes with a similar wheel 39 on a longitudinal shaft 40 having a threaded portion 41 which engages a nut 42 on the work support 6, and provides means for feeding said support toward and away from the head 3. The shaft 40 is extended to the opposite end of the machine, as shown in Fig. 3ª; and is there connected through the medium of gears 43 and 44 with another longitudinal screw shaft 45 which engages a nut 46 on the movable head 4. In view of the fact that when the work support 6 is moved to the left, the movable head 4 must be moved endwise twice as far as said support in order to bring the two hobs or cutters to the same position with reference to the vertical axis of the blank 7, the gears 43 and 44 are so proportioned relatively to each other and to the pitch of the screw shafts 40 and 45 as to cause the head 4 to move twice as fast as the work support 6 when the clutch 38 is in gear. The gear 44 may be provided with a clutch connection 47 with the shaft 45 so that said gear can be thrown out of driving engagement with its said shaft when it is desired to move the work support independently of the head 4.

The shaft 32 also carries, at the opposite side of the machine from the gear 31, a bevel gear 48 which drives a bevel gear 49 on a longitudinal shaft 50. This shaft 50 is connected through gears 51 to the transverse shaft 52 (Fig. 3ª) which, through the bevel gears 53, drives the shaft 35† at the right hand end of the machine.

The operation of the machine is as follows:—The gear blank 7 having been secured in place on the table or support 6, the shaft 18 is set in motion to cause the rotation of the two hobs or cutters. The clutch 38 is then operated to move the blank support 6 toward the hob 8. The clutch 47 is then actuated to move the head 4 to bring the hob 9 into proper cutting relation to the blank. The feeding movement of the blank and of the head 4 relatively to the hob 8 is continued until the required depth of cut is reached. When the required depth of cut is reached the clutch 38 is thrown out of gear. As the two hobs are fed downwardly, said blank and hobs are in the meantime rotated at speeds such as would be imparted if either the blank or the hobs were rotated by their engagement with each other. In this manner the two sets of teeth are simultaneously formed. Owing to the fact that the guides 13 have an angularity with respect to the vertical axis of the blank, equal to the angularity of the teeth with respect to such axis, it will be readily seen that both sets of teeth will be cut at the required, but at opposite, angles by the feeding movement of the hobs while cutting, without any change in their relative speeds and without the necessity for any endwise movement thereof, except the endwise component included in their angular movement. This avoids the use of differential or other special gearing and thereby reduces the possibility of lost motion with resultant inaccuracy in the work.

I have shown the head 3 stationary and have given the entire movement to the head 4 because this somewhat simplifies the construction of the machine and reduces the number of movable gears which are required. The only gears which require to have movement relative to their driving shafts are one of the gears 17 and one of the gears 51.

I do not limit myself to the particular arrangement of the hobs shown in which they are mounted to work at opposite sides of the blank.

As before indicated, the same result can be obtained by mounting the blank on an oblique axis and giving the hobs or cutters a vertical feeding movement. This is illustrated diagrammatically in Fig. 5 in which the blank is shown at 54 on the inclined table 55 driven by the worm gear 56. 57 is one of the feeding slides movable vertically in the guides 58, and 59 is one of the hobs carried on the transverse shaft 60.

Fig. 6 shows another modification in which the blank 61 is supported on a horizontal table, as in the form first described, and the feeding slide 62 works on angular guides 63 as in the first form; but in which the hob shafts are at an oblique angle to the vertical axis of the blank. One of the shafts is indicated at 64 in Fig. 6. One advantage of this arrangement is that it permits of the use of a single-threaded hob in certain cases, where with an arrangement such as shown in Fig. 4 a multiple-threaded hob would be necessary. For instance, in cutting a gear with a thirty degree angle in the arrangement shown in Fig. 4, the hob would have to have its cutter at an angle of thirty degrees to its axis; while with the arrangement shown in Fig. 6, a gear having teeth with an angle of thirty degrees could be cut, for instance, with a hob having an angle of ten degrees. This is due to the fact that in the form shown in Fig. 6, the angularity of the hob shaft with respect to the axis of the blank brings the cutter more nearly into parallelism with the teeth to be cut, and to that extent reduces the lead of the hob.

It will be noted that in the arrangement shown in Figs. 2 and 4, the teeth produced are at the same angle as that of the cutting teeth on the hob; while in Figs. 5 and 6, the teeth produced have a greater angle than that of the cutting teeth on the hob. In each of Figs. 5 and 6, the angle of the teeth is equal to the angle of the hob teeth plus the angle of inclination of the blank in Fig. 5 or of the guide 63 in Fig. 6.

It will be understood that the broader features of my invention are independent of the particular arrangement of gearing, etc., which I have illustrated, and that various changes can be made in the general construction and arrangement of the machine within the scope of the appended claims without departing from my invention.

What I claim is:

1. In a machine for cutting double helical gears, a pair of rotary hobs mounted on separate axes and arranged to act upon a continuously revolving gear blank, and means for feeding both hobs in the same direction in a line oblique to the axis of the gear blank; substantially as described.

2. In a machine for cutting double helical gears, a pair of rotary hobs mounted on separate axes and arranged to act upon a continuously revolving gear blank, means for rotating the blank and hobs at speeds such as would be imparted if either the blank or the cutters were rotated by their engagement with each other, and means for feeding both hobs in the same direction and obliquely to the axis of the blank; substantially as described.

3. In a machine for forming double helical gears, two rotary cutters, means for feeding said cutters in the same direction and at an angle to the axis of the blank to be cut, and means for driving both cutters at substantially the same speed; substantially as described.

4. In a machine for forming double helical gears, two rotary cutters mounted to act simultaneously upon opposite sides of a blank, one of said cutters being arranged to cut downwardly from one end of the blank toward its center, and the other to cut from the central portion of the blank downwardly toward its lower edge, and means for feeding both cutters in the same direction and at an angle to the axis of the said blank; substantially as described.

5. In a machine for forming double helical gears, a rotary blank carrier, two tool carriers movable in the same direction but at an angle to the axis of the blank to be cut, and a cutter mounted on each carrier, said cutters being arranged to act simultaneously upon different portions of the blank; substantially as described.

6. In a machine for forming double helical gears, a rotary blank carrier, two tool carriers movable in the same direction but at an angle to the axis of the blank to be cut, and a cutter mounted on each carrier, said cutters being arranged to act simultaneously upon different portions of the blank, together with means for driving both cutters at substantially the same speed; substantially as described.

7. In a machine for forming double helical gears, the combination of a rotary blank support, means for rotating said support, two heads arranged at opposite sides of said support, a tool carrier mounted on each of said heads and movable downwardly at an angle to the axis of the blank to be cut, feeding means for said tool carriers, tools mounted on the carriers, and means for rotating both tools at substantially the same speed; substantially as described.

8. In a machine for forming double helical gears, the combination of a rotary blank support, means for rotating said support two heads arranged at opposite sides of said support, a tool carrier mounted on each of said heads and movable downwardly at an angle to the axis of the blank to be cut, feeding means for said tool carriers, tools mounted on the carriers, and means for rotating both tools at substantially the same speed, at least one of said heads being movable toward and away from the other; substantially as described.

9. In a machine for forming double helical gears, the combination of a rotary blank support, means for rotating said support, two heads arranged at opposite sides of said support, a tool carrier mounted on each of said heads and movable downwardly at an angle to the axis of the blank to be cut, feeding means for said tool carriers, tools mounted on the carriers, means for rotating both tools at substantially the same speed, one of said heads being fixed and the other head being movable, and means for moving the work support and the movable head toward and away from the fixed head; substantially as described.

10. In a machine for forming double helical gears, the combination of a rotary blank support, means for rotating said support, two heads arranged at opposite sides of said support, a tool carrier mounted on each of said heads and movable downwardly at an angle to the axis of the blank to be cut, feeding means for said tool carriers, tools mounted on the carriers, means for rotating both tools at substantially the same speed, one of said heads being fixed and the other head being movable, and means for moving the work support and the movable head toward and away from the fixed head, said means being arranged to move the movable head approximately twice as fast as the work support; substantially as described.

11. In a machine for forming double helical gears, a supporting frame having two heads thereon, one of said heads being fixed and the other movable, a work support intermediate the two heads, each of said heads having inclined guides, a tool carrier mounted to move on each of said guides, means for actuating both tool carriers, a rotary cutter on each tool carrier, means for rotating both cutters at substantially the same speed, means for rotating the work support, and means for moving the work support and the movable head toward and away from the fixed head; substantially as described.

In testimony whereof, I have hereunto set my hand.

THOMAS FAWCUS.

Witnesses:
 Geo. B. Bleming,
 Geo. H. Parmelee.